(12) United States Patent
Huang (10) Patent No.: US 12,324,413 B1
(45) Date of Patent: Jun. 10, 2025

(54) AUXILIARY PET TRAINING APPARATUS (71) Applicant: Zhican Huang, Fujian (CN)

(72) Inventor: Zhican Huang, Fujian (CN)

( * ) Notice: Subject to any disclaimer, the term of this patent is extended or adjusted under 35 U.S.C. 154(b) by 27 days.

(21) Appl. No.: 18/520,575

(22) Filed: Nov. 28, 2023

(51) Int. Cl.
*A01K 15/02* (2006.01)
(52) U.S. Cl.
CPC .................................. *A01K 15/022* (2013.01)
(58) Field of Classification Search
CPC ..... A01K 15/022; A01K 15/02; A01K 15/021
See application file for complete search history.

(56) References Cited

U.S. PATENT DOCUMENTS

| | | | | |
|---|---|---|---|---|
| 4,947,795 | A | * | 8/1990 | Farkas ................. A01K 27/009 119/718 |
| 5,351,653 | A | * | 10/1994 | Marischen ........... A01K 15/021 119/905 |
| 2012/0130154 | A1 | * | 5/2012 | Sajan ..................... G10L 21/06 600/23 |

FOREIGN PATENT DOCUMENTS

JP     2004212685 A  *  7/2004  .......... A01K 15/022

OTHER PUBLICATIONS

Translation module and speech translations device (Year: 2004).*

* cited by examiner

*Primary Examiner* — Yvonne R Abbott-Lewis (57) ABSTRACT

The present invention discloses an auxiliary pet training apparatus, where pet bark is received by a microphone, amplified through an amplification circuit, subjected to signal filtering, and transmitted to a micro-processing module; the micro-processing module receives a corresponding electrical signal, and transmits a control signal to a pulse generating device and a vibration module; a pulse module outputs a pulse current to be transmitted to a conductive sleeve via a vibration head sleeve; and a vibration motor in the vibration module is started to transmit vibration to the vibration head sleeve. The present invention provides an auxiliary pet training apparatus providing stimulation for pets using low-voltage pulse current in combination with mechanical vibration, thereby achieving training for the pets, avoiding occurrence of electric arcs to damage fur of the pets, and preventing injury to a user due to touch by mistake.

10 Claims, 6 Drawing Sheets

AUXILIARY PET TRAINING APPARATUS

TECHNICAL FIELD

The present invention relates to the field of pet training apparatuses and, more particularly, to an auxiliary pet training apparatus.

BACKGROUND OF THE INVENTION

With the improvement of people's living standards, people's attention to the quality of life of pets is increasing, and more and more people regard pets as one of their family members. However, a pet sometimes cannot well control themselves, its barking often interferes with people's normal life, and at the same time, a pet owner is at a potential risk of being condemned by the neighbors. In order to prevent the pet from barking frequently, an auxiliary pet training apparatus is designed, and the auxiliary pet training apparatus trains the pet to stop barking when the pet barks.

The existing auxiliary pet training apparatus uses high-voltage pulse to stimulate pets. However, in practical application, high-voltage pulse current is easy to generate electric arc, cause burns and other injuries to the skin and hair of pets, and may also cause harm when wrongly touched, causing physical and mental injury to users.

BRIEF SUMMARY OF THE INVENTION

In order to overcome the disadvantages of physical hazards caused by the use of high-voltage pulse current in the existing auxiliary pet training apparatus, the present invention provides an auxiliary pet training apparatus providing stimulation for pets using low-voltage pulse current in combination with mechanical vibration, thereby achieving training for the pets, avoiding occurrence of electric arcs to damage fur of the pets, and preventing injury to a user due to touch by mistake.

The technical solution of the present invention is as follows:

an auxiliary pet training apparatus, wherein pet bark is received by a microphone, amplified through an amplification circuit, subjected to signal filtering, and transmitted to a micro-processing module; the micro-processing module receives a corresponding electrical signal, and transmits a corresponding control signal to a pulse generating device and a vibration module; a pulse module outputs a pulse current to be transmitted to a conductive sleeve via a vibration head sleeve; and a vibration motor in the vibration module is started to transmit vibration to the vibration head sleeve.

According to the above-mentioned auxiliary pet training apparatus, wherein a body of the auxiliary training apparatus is a main machine housing, the main machine housing comprises an upper housing and a lower housing, the upper housing is provided with a protruding extending opening, and is respectively provided with a contact and an audio device; the lower housing serves as an accommodating space for providing an electrical structure, comprising a pulse generating device, a battery, a transformer and a circuit board; and all the electrical structures adopt a transverse structure.

According to the above-mentioned auxiliary pet training apparatus, a structure inside the contact comprises, from inside to outside, a motor bracket provided with the vibration motor, an insulation sleeve, the vibration head sleeve and the conductive sleeve, the vibration motor extends downwards to be connected to a circuit board, the vibration of the vibration motor is transmitted outwards through the motor bracket, and the motor bracket transmits the vibration to the vibration head sleeve via the insulation sleeve covering the motor bracket externally, and then the vibration head sleeve transmits the vibration to a pet via the conductive sleeve.

Furthermore, the materials of the vibration head sleeve and the conductive sleeve are both conductive materials, and the vibration head sleeve extends downwards and expands to contact a pulse generating line of the pulse generating device on the circuit board, so that the pulse current flows into the vibration head sleeve and is transmitted to the conductive sleeve via a contact connection between the vibration head sleeve and the conductive sleeve.

According to the above-mentioned auxiliary pet training apparatus, wherein an end of the motor bracket is provided with two layers of protruding arc-shaped snap rings spaced at a certain distance apart, an extension opening of a main machine housing of the auxiliary training apparatus is provided with protruding arc-shaped fixing buckles, the end of the motor bracket is inserted into the extension opening and then rotates, a relationship between the fixing buckles and the snap rings changes from interleaving to embedded clamping, and the motor bracket is connected to the extension opening of the main machine housing.

Furthermore, the fixing buckle is provided with a limiting rib.

In one of the above-described auxiliary pet training apparatus, respective pendulums of the vibration motor are directed toward the inside of a surrounding space of the vibration motor so that vibration waves generated by the pendulums are superimposed in a certain space.

According to the above-mentioned auxiliary pet training apparatus, an insulating layer is sleeved outside the motor bracket, or the motor bracket is made from an insulating material.

In one such auxiliary pet training apparatus, the motor bracket is in interference fit connection with the vibration head sleeve.

According to the above-mentioned auxiliary pet training apparatus, wherein the surface of the vibration head sleeve is provided with a plurality of protruding limit rings, the conductive sleeve covering the outer surface of the vibration head sleeve is provided with limit slots at corresponding positions, and the limit rings are embedded in the limit slots.

According to the above-mentioned auxiliary pet training apparatus, the diameter of the bottom of the vibration head sleeve is increased, wherein one end thereof forms a protruding table-shaped structure, an insertion slot is provided on the table-shaped structure, and a structure such as a pin or insert is provided on the circuit board where the pulse generating device is located, and the pin or insert is embedded in the insertion slot, so that the vibration head sleeve and the circuit board are electrically connected.

In one such auxiliary pet training apparatus, the surface of the conductive sleeve is provided with a plurality of protruding circular contact points.

According to the above-mentioned auxiliary pet training apparatus, the micro-processing module is connected to a terminal device via a wireless communication module, a user sets a vibration mode of the vibration motor and a pulse current mode of the pulse generating device via the terminal device, an electric signal of the terminal device is transmitted to the micro-processing module via the wireless communication module, and the micro-processing module saves a control mode and triggers the control signal according to a signal fed back by the microphone, and transmits the control signal to the vibration motor and the pulse generating device respectively According to the above-mentioned solution, the present invention has an advantageous effect in that 1. In the present invention, a low-voltage pulse current is used, which is originally used to input a specific low-frequency pulse current into a human body to stimulate nerves to achieve an analgesic effect, and is now used to stimulate a pet to stop barking and for training; for a pet with a higher sensitivity than human skin, the stimulation effect can be achieved, and the low-frequency pulse current does not generate an arc, does not burn the human skin and pet hair, and does not cause damage to the human body when the human body touches by mistake, thus avoiding physical and mental damage to the human body and the pet.

2. In the present invention, pulse current stimulation and vibration stimulation are simultaneously used to train pets, and both the pulse current stimulation and the vibration stimulation are in the same position, giving the pets greater stimulation, saving a set volume, making the structure simpler and the assembly simpler. In order to achieve this object, the vibration motor generating vibration is covered by the vibration head sleeve and the conductive sleeve capable of transmitting pulse current, so that the vibration generated by the vibration motor is directly transmitted to the vibration head sleeve and the conductive sleeve, thereby improving the vibration transmission efficiency, and at the same time, the two are separated by an insulator to avoid the influence of pulse current on the vibration motor, and the vibration of the vibration motor is transmitted outward through the vibration head sleeve and the conductive sleeve.

3. According to the present invention, a vibration motor is provided inside a motor bracket which is provided at an extending opening of a main machine housing, and is fixed via an embedded structure, so that the vibration transmitted from the vibration motor to the motor bracket is prevented from having an impact on a circuit board, and a vibration head sleeve is made of a soft material, so that the transmission from top to bottom is attenuated by self-deformation, and the impact on the circuit board is minimal. In addition, the motor bracket fills the inner space of the vibration head sleeve, and directly transmits the vibration to improve the transmission efficiency as well as to improve the strength of the vibration head sleeve and prevent it from being damaged by external force.

4. The connection between the conductive sleeve and the vibration head sleeve of the present invention is achieved through the connection between the limit ring and the limit slot, and therefore the conductive sleeve housing is peeled off by an external force, and a variety of different shapes and types of conductive sleeves can be replaced to improve the diversity of vibration modes and pulse current modes. The conductive sleeve adopts a form of multi-point contact, increases the contact area and stimulation points, ensures the contact effect, and avoids the damage caused by energy concentration.

BRIEF DESCRIPTION OF THE DRAWINGS

In order to explain the technical solutions in the embodiments of the present invention more clearly, a brief description will be given below with reference to the accompanying drawings which are used in the description of the embodiments or the prior art, and it is obvious that the drawings in the description below are merely some embodiments of the present invention, and it would have been obvious for a person skilled in the art to obtain other drawings according to these drawings without involving any inventive effort.

Reference numerals are as follows:
- 01. main machine housing; 011. upper housing; 0111. extending opening; 012. lower housing; 013. key switch; 014. fixing buckle;
- 02. contact; 03. microphone; 04. speaker; 05. battery; 06. transformer;
- 07. circuit board; 071. pin or insert;
- 08. motor bracket; 081. vibration motor; 0811. pendulum; 082. snap ring;
- 09. vibration head sleeve; 091. limit ring;
- 010; conductive sleeve; 0101. contact point; 0102. limit slot.

DETAILED DESCRIPTION OF THE INVENTION

In order that the technical problems, technical solutions and advantages to be solved by the present invention can be more clearly understood, the present invention will now be described in further detail with reference to the accompanying drawings and examples. It should be understood that the particular embodiments described herein are illustrative only and are not limiting.

An auxiliary pet training apparatus, wherein pet bark is received by a microphone 03, amplified through an amplification circuit, subjected to signal filtering, and transmitted to a micro-processing module; the micro-processing module receives a corresponding electrical signal, and transmits a control signal to a pulse generating device and a vibration module; a pulse module outputs a pulse current to be transmitted to a conductive sleeve 010; and a vibration motor 081 in the vibration module is started to transmit vibration to the vibration head sleeve 09 to achieve training a pet to stop barking.

Figure 1:
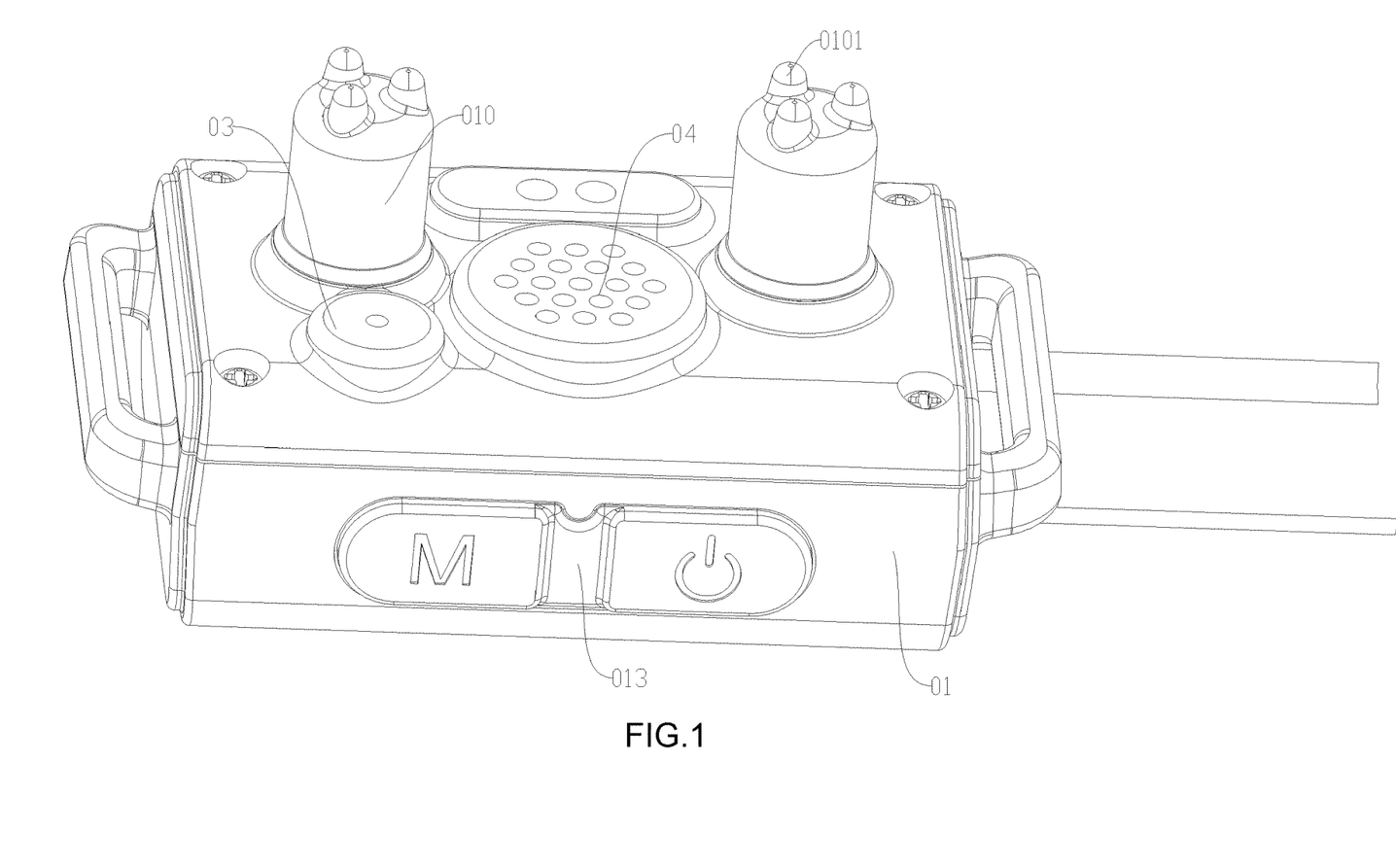
FIG. 1 is a schematic view showing the structure of the present invention.
Figure 2:
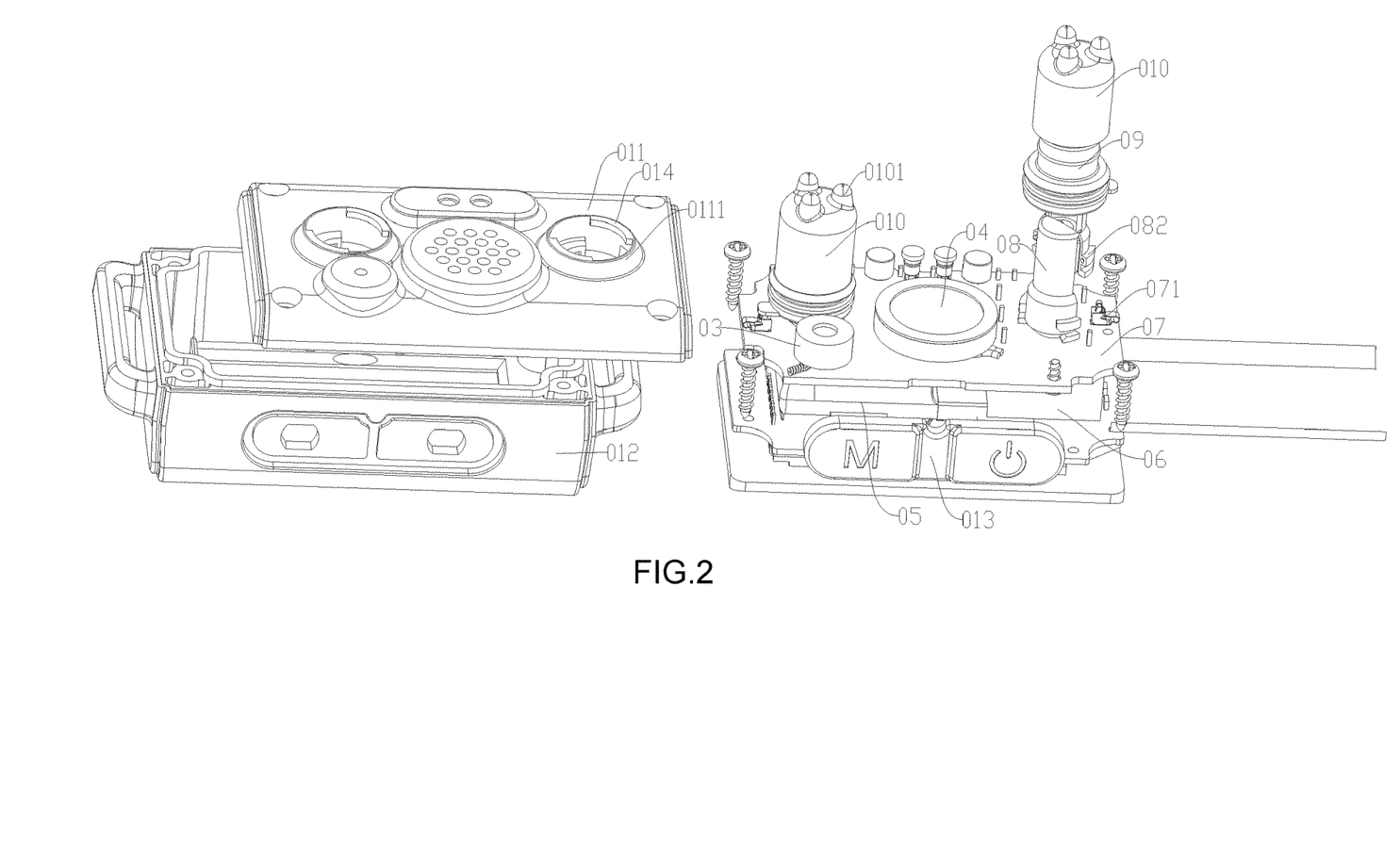
FIG. 2 is an exploded view I of the structure of the present invention.
Figure 3:
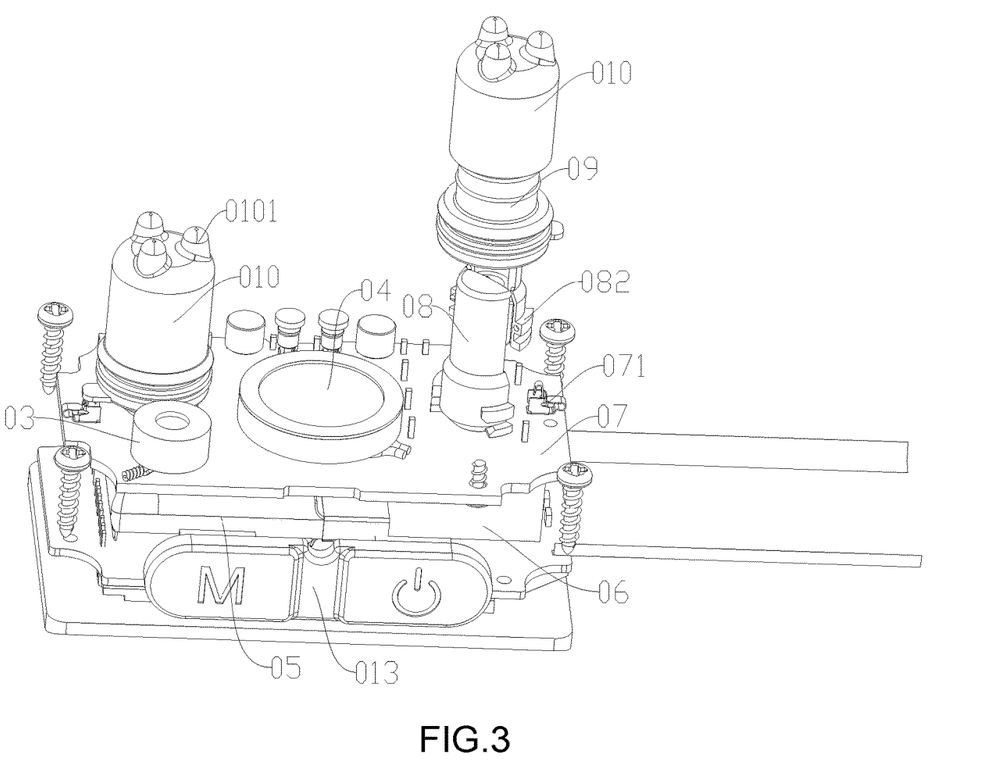
FIG. 3 is a partial enlarged view of FIG. 2.
Figure 4:
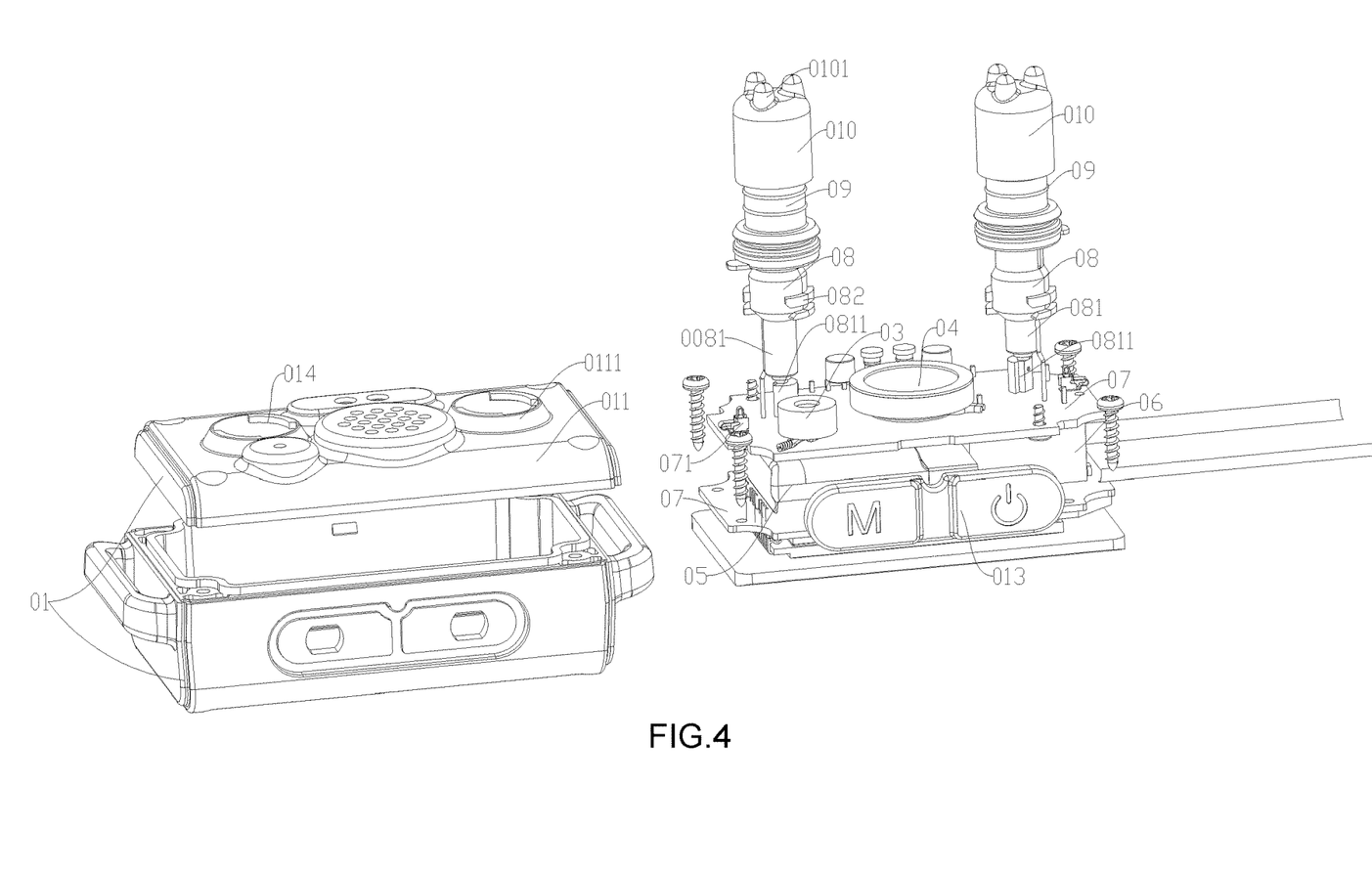
FIG. 4 is an exploded view II of the structure of the present invention.
Figure 5:
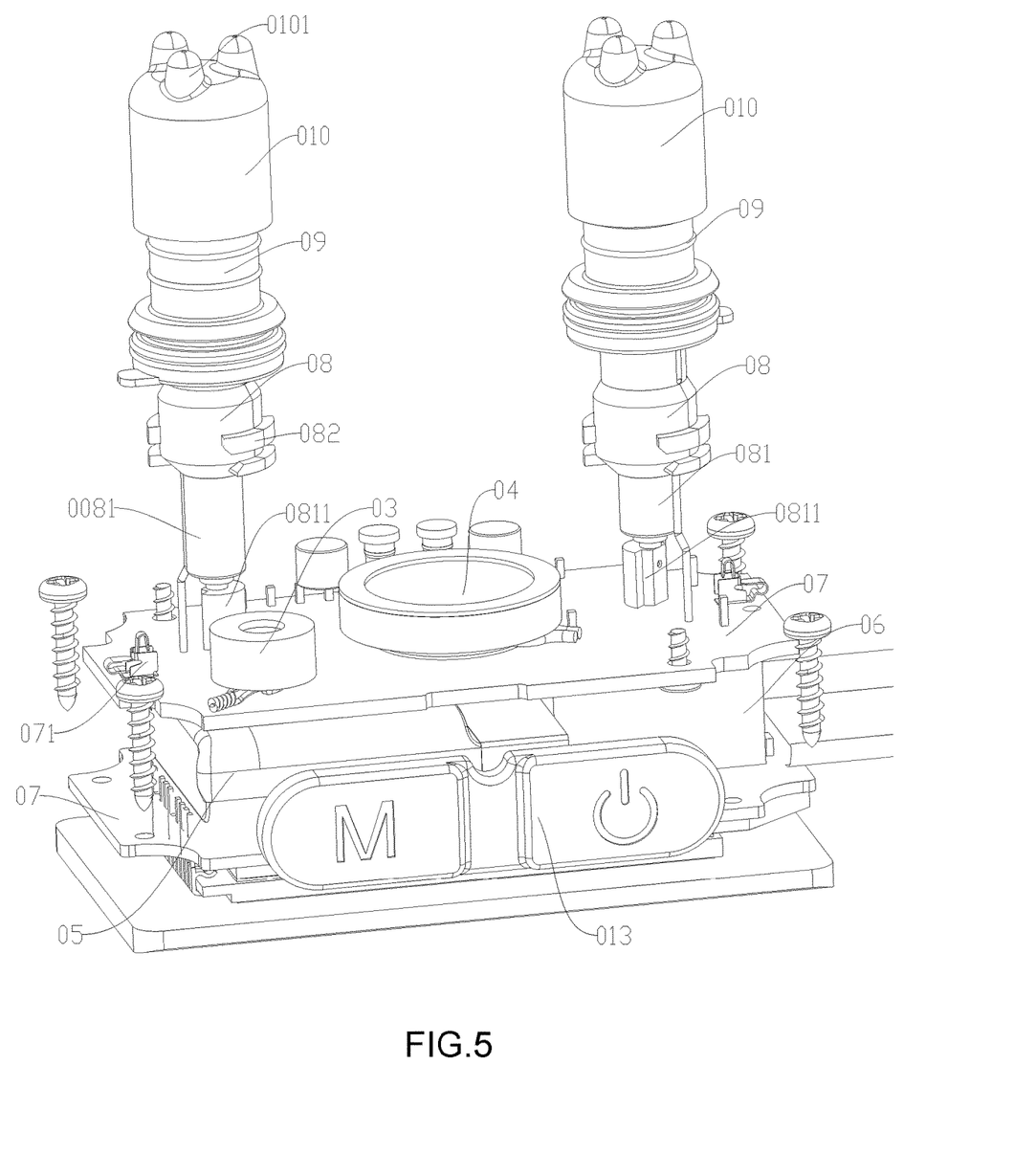
FIG. 5 is a partial enlarged view of FIG. 4.

As shown in FIG. 1, a body of the auxiliary training apparatus is a main machine housing 1 comprising an upper housing 011 and a lower housing 012, wherein the upper housing 011 is provided with a protruding extending opening 0111 and is respectively provided with a contact 02 and an audio device, the lower housing 012 serves as an accommodating space for providing an electrical structure, and screws are provided at four corners after being snapped between the upper housing 011 and the lower housing 012.

As shown in FIG. 2, FIG. 3, FIG. 4 and FIG. 5, a plurality of electrical structures including a pulse generator, a battery 05, a transformer 06 and a circuit board 07 are provided in the inner space surrounded by the main machine housing 1. All the electrical structures are in form of transverse structures transversely stacked upward from the bottom housing base plate (the bottom plate structure of the lower housing 012) on which the circuit board 07 is placed, an arc-shaped convex structure at the four corners of the lower housing 012 is used, an arc-shaped notch is formed by all the plate-shaped structures including the circuit board 07, an assembly is formed between the arc-shaped convex structure of the lower housing 012 and the arc-shaped notch, clamped on the surface of the convex structure and fixed via a screw, and then gaps between the convex structures are used to set a line to realize an electrical connection among various transverse electrical structures. If there are a plurality of circuit board 07 structures, they are respectively arranged on the upper and lower sides of the structures such as the battery 05 and the transformer 06, and then the electrical connection between the two circuit boards 07 is realized by inserting a needle-shaped structure of the circuit of the circuit board 07. In this way, it is possible to reduce the size of the device to a large extent and to make full use of the space in the body case 1. A key switch 013 is provided on the lower circuit board 07, and is passed through the surface of the main machine housing 1 via a soft button of the outer sleeve, so that the soft button protrudes out of the main machine housing 1 and is provided on a side of the main machine housing 1 to facilitate pressing. Extending openings 0111 are respectively provided on two sides of the upper housing 011, contacts 02 are symmetrically provided, and an extending opening 0111 provided in the middle is provided with a loudspeaker 04 and a microphone 03 of an audio device.

The battery 05 and the transformer 06 are arranged between the upper and lower circuit boards 07 to be connected to the circuit boards 07 at the two ends, and the power supply of the battery 05 to the vibration motor 081 is realized by the circuit boards 07. The battery 05 is connected to the transformer 06 to supply the voltage required by the circuit board 07.

A structure inside the contact 02 comprises a motor bracket 08, an insulation sleeve, a vibration head sleeve 09 and a conductive sleeve 010 which are provided with the vibration motor 081 from the inside to the outside; the vibration motor 081 extends downwards to be connected to the circuit board 07; the vibration motor 081 obtains the electric energy of the battery 05 and a control signal via the circuit board 07; and the vibration motor 081 is started to vibrate via the control signal obtained by the micro-processing module of the circuit board 07. The vibration of the vibration motor 081 is transmitted outwards through the motor bracket 08, and the motor bracket 08 transmits the vibration to the vibration head sleeve 09 via the insulation sleeve covering the motor bracket externally, and then the vibration head sleeve 09 transmits the vibration to a pet via the conductive sleeve 010 to have an effect of vibration training for the pet. On the other hand, both the vibration head sleeve 09 and the conductive sleeve 010 are made of a conductive material; in this embodiment, the material of both the vibration head sleeve 09 and the conductive sleeve 010 is conductive silicone; the vibration head sleeve 09 extends downwards and spreads out a pulse generating line contacting the pulse generating device on the circuit board 07, so that a pulse current flows into the vibration head sleeve 09, and then is transmitted to the conductive sleeve 010 via a contact connection between the vibration head sleeve 09 and the conductive sleeve 010; and a plurality of protruding contact points 0101 are provided on the conductive sleeve 010, and the pulse current acts on the pet epidermis via these contact points 0101.

The motor bracket 08 has a housing-like structure in which a vibration motor 081 is built. The connection between the motor bracket 08 and the main machine housing 1 is an embedded snapping; specifically, upper and lower layers of protruding arc-shaped snap rings 082 are provided at an end of the motor bracket 08, a certain distance exists between the two snap rings 082, and correspondingly, a protruding arc-shaped fixing buckle 014 is provided at the position of the extending opening 0111 of the upper housing 011, and a limiting rib is provided at one end of the fixing buckle 014. The end of the motor bracket 08 is inserted into the extending opening 0111, at this time, the fixing buckles 014 and the snap rings 082 are arranged alternately, and in an aspect of height, the space between the fixing buckles 014 and the snap rings 082 is flush; the motor bracket 08 is rotated, so that the fixing buckles 014 are embedded among the snap rings 082, until the snap rings 082 are blocked by the limiting rib, so that the motor bracket 08 is connected to the extending opening 0111 of the main machine housing 1. The way of rotary snapping enables the motor bracket 08 and the built-in vibration motor 081 to achieve a separable connection to facilitate installation and replacement of parts and the connection of electrical parts, and it is implemented by cutting a connection line to be re-connected.

The number of the vibration motors 081 may be arbitrarily set, and the orientation of the pendulum 0811 of the vibration motor 081 may also be arbitrarily set. In this embodiment, it is preferable that the auxiliary training apparatus is provided with the vibration motor 081 on the left and right sides, and the pendulums 0811 of the vibration motor 081 are arranged opposite to each other (i.e., the pendulums 0811 are arranged face to face, and the pendulums 0811 face inward). The vibration of the vibration motor 081 propagates in the form of waves, and when the pendulums 0811 of the two vibration motors 081 are placed towards or away from each other, the vibration waves generated by them may have different interference and superposition effects. In general, the vibration waves generated by the two vibration motors 081 are completely in phase, and when they are arranged opposite to each other, an additive effect is generated on the plane perpendicular to them, resulting in stronger vibration, whereas when they are arranged opposite to each other (the pendulum 0811 faces outward), the vibration waves generated by same have a phase difference or amplitude difference, and a subtractive effect is generated on the plane perpendicular to them, resulting in weaker vibration. Therefore, in order to achieve a better vibration effect, the pendulums 0811 of the two vibration motors 081 are arranged opposite to each other. In other embodiments, where the number of vibration motors 081 is increased and their placement is still symmetrical, the pendulum 0811 of vibration motor 081 is oriented toward the center of symmetry of all vibration motors 081. If the position is not symmetrical, it is necessary to analyze the transmission center of vibration wave. In any case, the pendulum 0811 is always directed toward an inner position among the respective vibration motors 081. The vibration modes of the vibration motor 081 may include three modes of alternating vibration of the left and right motors, single vibration, and simultaneous vibration.

An insulating layer is sleeved outside the motor bracket 08. In other embodiments, the motor bracket 08 is composed of an insulating material, so that the vibration motor 081 is separated from the vibration head sleeve 09 and the conductive sleeve 010, which can conduct electricity to prevent pulse current from being transmitted to the vibration motor 081 via the vibration head sleeve 09, thus affecting the normal operation of the vibration motor 081. The motor bracket 08 and the vibration head sleeve 09 are in an interference fit connection, on the one hand, the motor bracket 08 plays a waterproof function and improves the sealing performance of the structure; on the other hand, the vibration transmitted by the motor bracket 08 can be transmitted to the vibration head sleeve 09 without excessive weakening, thereby improving the vibration transmission efficiency.

Figure 6:
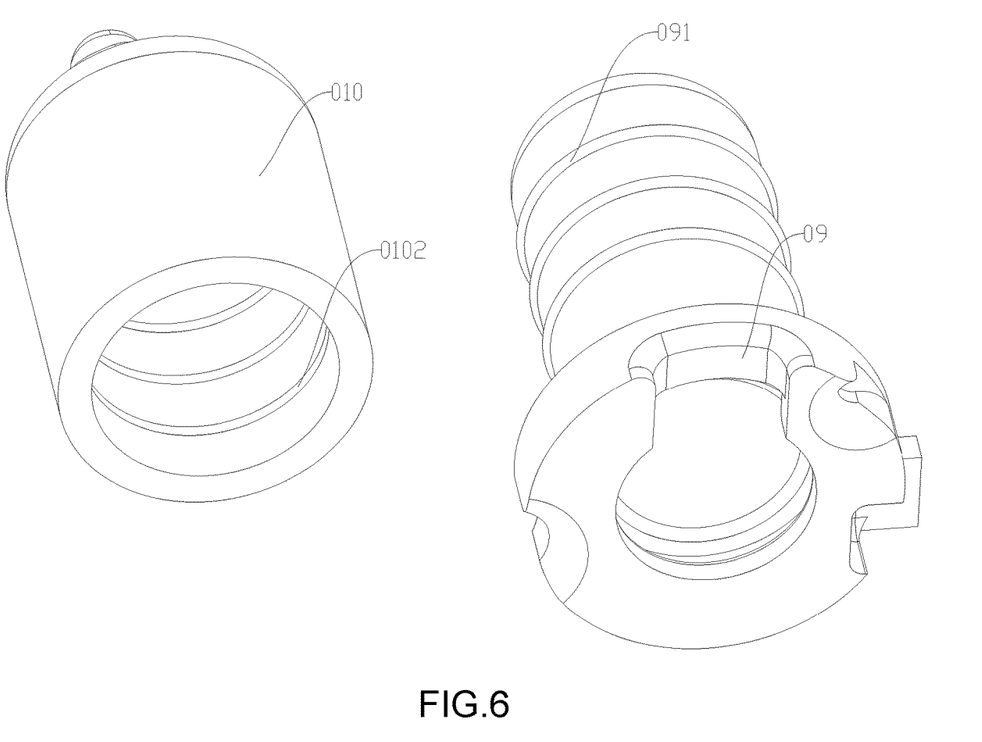
FIG. 6 is a schematic view showing the structure of the vibration head sleeve and the conductive sleeve.

The vibration head sleeve 09 covers the surface of the motor bracket 08 to realize the vibration conduction of the vibration motor 081 and the conduction of the pulse current. As shown in FIG. 6, the surface of the vibration head sleeve 09 is provided with a plurality of protruding limit rings 091; at corresponding positions, the conductive sleeve 010 covered by the outer surface of the vibration head sleeve 09 is provided with limit slots 0102; when the conductive sleeve 010 covers the surface of the vibration head sleeve 09, the limit rings 091 are embedded in the limit slots 0102 to improve the fastening of the connection between the vibration head sleeve 09 and the conductive sleeve 010, and reduce the possibility of the conductive sleeve 010 falling off in an unexpected situation. The diameter of the bottom of the vibration head sleeve 09 increases, wherein one end thereof forms a protruding table-shaped structure, an insertion slot is provided on the table-shaped structure, a structure such as a pin or a plug-in piece 071 is provided on the circuit board 07 where the pulse generating device is located, and the pin or insert 071 is inserted into the insertion slot so that the vibration head sleeve 09 and the circuit board 07 are electrically connected, so that the pulse current generated by the pulse generating device is transmitted to the vibration head sleeve 09, and is transmitted to the conductive sleeve 010 of the peripheral device via the vibration head sleeve 09, and the pulse current is transmitted to the pet via the conductive sleeve 010 to generate stimulation.

The conductive sleeve 010 adopts a multi-point contact mode. In this embodiment, the surface of the conductive sleeve 010 is provided with a plurality of protruding circular contact points 0101, and the protruding structure thereof increases the contact area for the pet. In a case where low-voltage pulse current is used instead to reduce the stimulation, the pulse current stimulation is concentrated by means of the contact points 0101, and a multi-contact point 0101 structure is formed to improve the contact area and ensure the contact effect. Further, in this embodiment, the conductive sleeve 010 is provided on the surface of the vibration head sleeve 09 outside the main machine housing 1 only through the connection between the limit ring 091 and the limit slot 0102, and can be peeled off by applying an external force, so that a variety of different shapes of the conductive sleeve 010 can be replaced to match the change of the vibration mode with the change of the pulse current mode.

The pulse generating device sends out a pre-set low-voltage pulse current according to the control signal of the micro-processing module, and the pre-set low-voltage pulse current mode can be set according to the type of pets, including the current size, frequency, output duration, etc. to adapt to various types of pets. The form of low voltage pulse current include symmetrical bidirectional square wave current forms, medium or high frequency current forms modulated by unidirectional square wave, symmetrical bidirectional pulse current forms, unidirectional square wave current forms, asymmetrical bidirectional pulse current forms, etc. The output duration and magnitude of the low-voltage pulse current is controlled, so that the low-voltage pulse current exhibits a similar perception of "knocking, kneading, pressing and pricking", for example, the perception of "knocking" can be achieved by a short output duration in combination with an appropriate current magnitude, the perception of "kneading" can be achieved by a longer output duration in combination with a larger current magnitude, the perception of "pressing" can be achieved by a shorter output duration in combination with a larger current magnitude, the perception of "pricking" can be achieved by a short output duration in combination with a larger current magnitude, etc.

In this embodiment, the low-voltage pulse current generated by the pulse generating device is a TENS pulse current, the TENS pulse frequency is 2-160 Hz, the pulse width is 9-350 us, and the voltage is less than 100V.

Mode selections of a vibration motor 081 and the pulse generating device are both controlled and realized through a control signal transmitted by a micro-processing module, while the micro-processing module realizes human-computer interaction with a terminal device (a computer, a smart phone, etc.) through a wireless communication module; a user sets a vibration mode of the vibration motor 081 and a pulse current mode of the pulse generating device through the terminal device; these signals are transmitted to the micro-processing module through the wireless communication module; and the micro-processing module saves a control mode and triggers a control signal according to a signal fed back by a microphone 03, and transmits the control signal to the vibration motor 081 and the pulse generating device respectively.

While the present invention has been particularly shown and described with reference to preferred embodiments thereof, it will be understood by a person skilled in the art that various changes in form and details may be made therein without departing from the spirit and scope of the present invention.

What is claimed is:

1. An auxiliary pet training apparatus, wherein pet bark is received by a microphone, amplified through an amplification circuit, subjected to signal filtering, and transmitted to a micro-processing module; the micro-processing module receives a corresponding electrical signal, and transmits a control signal to a pulse generating device and a vibration module; a pulse module outputs a pulse current to be transmitted to a conductive sleeve via a vibration head sleeve; and a vibration motor in the vibration module is started to transmit vibration to the vibration head sleeve.

2. The auxiliary pet training apparatus according to claim 1, wherein a structure inside a contact comprises, from inside to outside, a motor bracket provided with the vibration motor, an insulation sleeve, the vibration head sleeve and the conductive sleeve, the vibration motor extends downwards to be connected to a circuit board, the vibration of the vibration motor is transmitted outwards through the motor bracket, and the motor bracket transmits the vibration to the vibration head sleeve via the insulation sleeve covering the motor bracket externally, and then the vibration head sleeve transmits the vibration to a pet via the conductive sleeve.

3. The auxiliary pet training apparatus according to claim 2, wherein the materials of the vibration head sleeve and the conductive sleeve are both conductive materials, and the vibration head sleeve extends downwards and expands to contact a pulse generating line of the pulse generating device on the circuit board, so that the pulse current flows into the vibration head sleeve and is transmitted to the conductive sleeve via a contact connection between the vibration head sleeve and the conductive sleeve.

4. The auxiliary pet training apparatus according to claim 1, wherein an end of the motor bracket is provided with two layers of protruding arc-shaped snap rings spaced at a certain distance apart, an extension opening of a main machine housing of the auxiliary training apparatus is provided with protruding arc-shaped fixing buckles, the end of the motor bracket is inserted into the extension opening and then rotates, a relationship between the fixing buckles and the snap rings changes from interleaving to embedded clamping, and the motor bracket is connected to the extension opening of the main machine housing.

5. The auxiliary pet training apparatus according to claim 1, wherein respective pendulums of the vibration motor are directed toward the inside of a surrounding space of the vibration motor so that vibration waves generated by the pendulums are superimposed in a certain space.

6. The auxiliary pet training apparatus according to claim 1, wherein an insulating layer is sleeved outside the motor bracket, or the motor bracket is made from an insulating material.

7. The auxiliary pet training apparatus according to claim 1, wherein the motor bracket is in interference fit connection with the vibration head sleeve.

8. The auxiliary pet training apparatus according to claim 1, wherein the surface of the vibration head sleeve is provided with a plurality of protruding limit rings, the conductive sleeve covering the outer surface of the vibration head sleeve is provided with limit slots at corresponding positions, and the limit rings are embedded in the limit slots.

9. The auxiliary pet training apparatus according to claim 1, wherein the diameter of the bottom of the vibration head sleeve is increased, wherein one end thereof forms a protruding table-shaped structure, an insertion slot is provided on the table-shaped structure, and a structure such as a pin or inserting plate is provided on the circuit board where the pulse generating device is located, and the pin or inserting plate is embedded in the insertion slot, so that the vibration head sleeve and the circuit board are electrically connected.

10. The auxiliary pet training apparatus according to claim 1, wherein the micro-processing module is connected to a terminal device via a wireless communication module, a user sets a vibration mode of the vibration motor and a pulse current mode of the pulse generating device via the terminal device, an electric signal of the terminal device is transmitted to the micro-processing module via the wireless communication module, and the micro-processing module saves a control mode and triggers the control signal according to a signal fed back by the microphone, and transmits the control signal to the vibration motor and the pulse generating device respectively.

* * * * *